United States Patent [19]

Yoon

[11] 4,363,787

[45] Dec. 14, 1982

[54] MONOLITH HEAT EXCHANGE REACTOR

[75] Inventor: Heeyoung Yoon, McMurray, Pa.

[73] Assignee: Conoco Inc., Stamford, Conn.

[21] Appl. No.: 104,987

[22] Filed: Dec. 18, 1979

[51] Int. Cl.³ .............................................. F28D 7/00
[52] U.S. Cl. ................................... 422/201; 165/165;
165/175; 422/173; 422/312; 422/180
[58] Field of Search ............... 422/173, 180, 190, 200,
422/201, 312; 165/165, 173, 175; 261/153;
48/197 R, 214 A

[56] References Cited

U.S. PATENT DOCUMENTS

| | | | |
|---|---|---|---|
| 1,894,768 | 1/1933 | Hechenbleikner | 422/201 X |
| 1,905,719 | 4/1933 | Jaeger | 422/200 X |
| 1,920,800 | 8/1933 | McCausland | 422/201 X |
| 2,013,707 | 9/1935 | Williams | 422/199 |
| 2,078,949 | 5/1937 | Houdry | 422/201 |
| 2,209,040 | 7/1940 | Simpson et al. | 196/52 |
| 2,518,270 | 8/1950 | Barr | 422/146 |
| 2,594,329 | 4/1952 | Mayhew | 48/196 |
| 2,655,437 | 10/1953 | Garbo | 422/201 X |
| 2,662,911 | 12/1953 | Dorschner et al. | 518/712 |
| 2,778,610 | 1/1957 | Bruegger | 257/262.19 |
| 2,852,350 | 9/1958 | Kolbel et al. | 422/201 |
| 2,868,627 | 1/1959 | Kolbel et al. | 422/200 |
| 4,017,274 | 4/1977 | Galstaun | 48/214 A |
| 4,101,287 | 7/1978 | Sweed et al. | 422/200 |

OTHER PUBLICATIONS

"Monolithic Catalyst Favored for Methanation", Tucci and Thompson, Hydrocarbon Processing, Feb., 1979, pp. 123-126.

Primary Examiner—Richard L. Chiesa
Attorney, Agent, or Firm—Dale Lovercheck; F. Lindsey Scott; William A. Mikesell, Jr.

[57] ABSTRACT

In a reactor consisting essentially of a monolithic substrate containing a plurality of substantially parallel channels having catalytic surfaces and means for charging a reactant stream into the channels and recovering a product stream from the channels, an improvement comprising; positioning a plurality of passageways through the monolithic substrate generally parallel to the channels with the passageways being adapted to pass a heat exchange fluid through the monolithic substrate.

2 Claims, 4 Drawing Figures

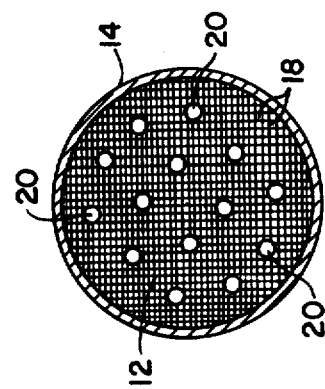
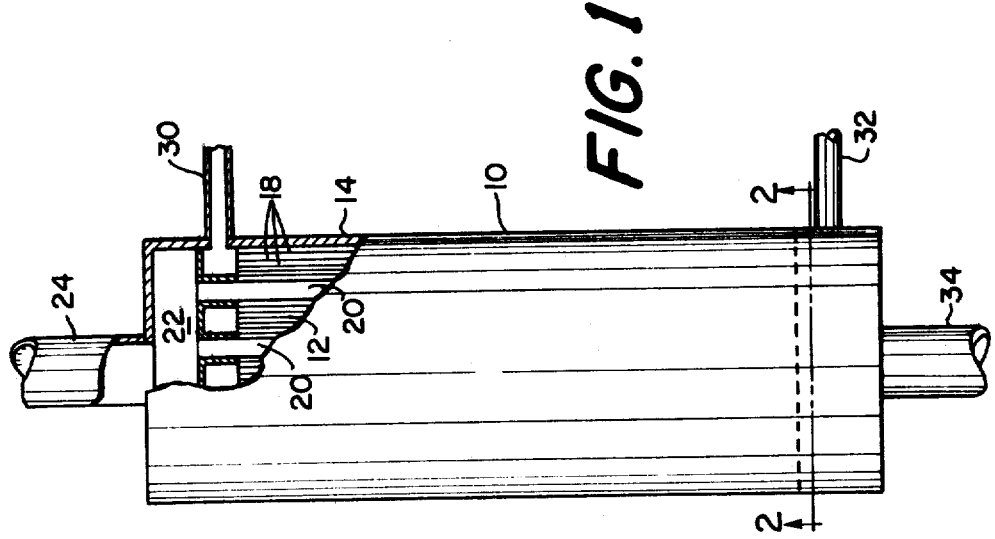

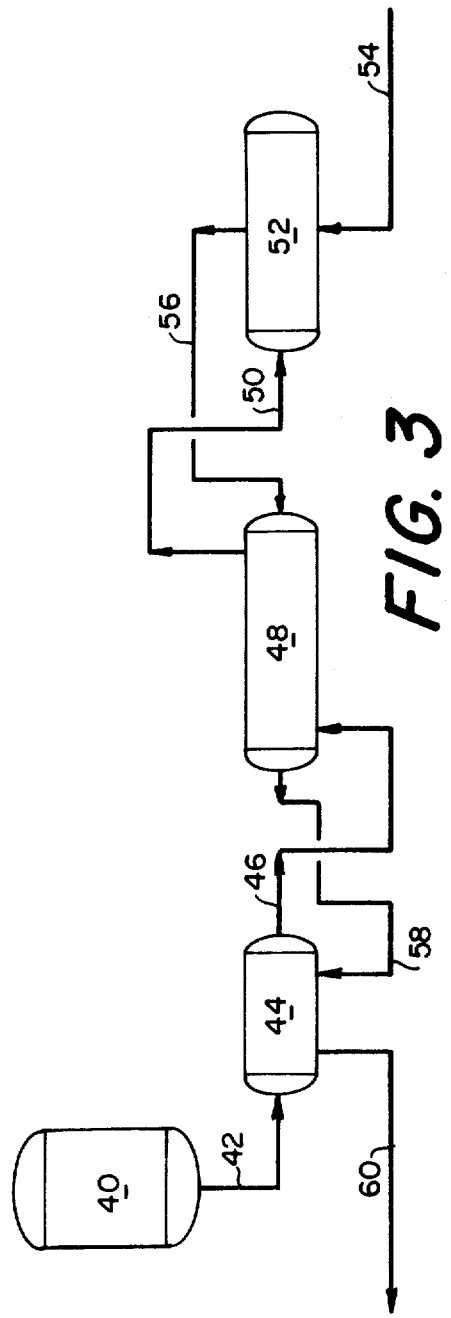
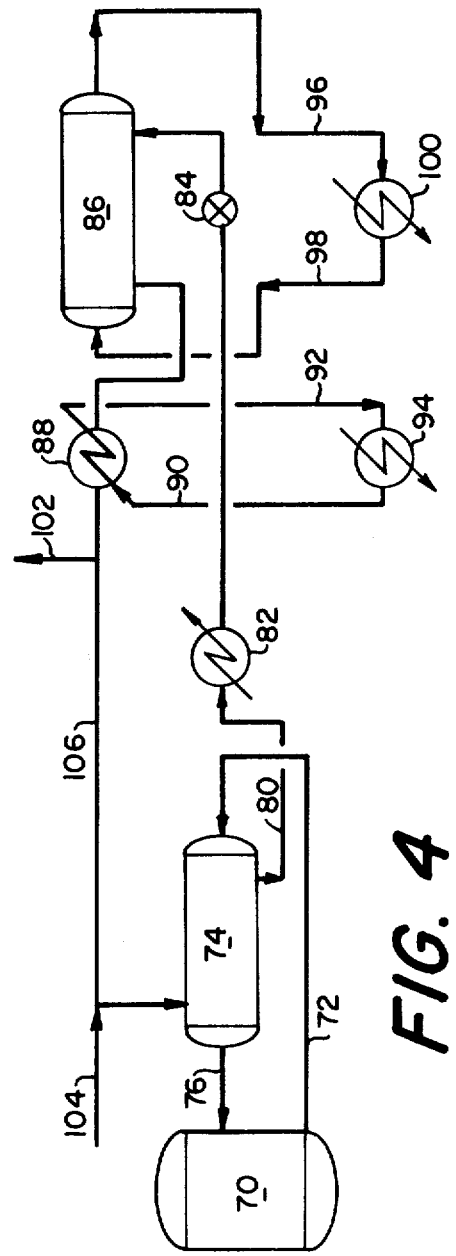

MONOLITH HEAT EXCHANGE REACTOR

This invention relates to monolithic substrate reactors for use in conducting catalytic exothermic reactions.

This invention further relates to monolithic substrate reactors for conducting catalytic endothermic reactions.

This invention further relates to a monolithic substrate reactor for conducting catalytic reactions wherein heat transfer means are positioned through the monolithic substrate for the transfer of heat from the substrate or for the transfer of heat to the substrate.

For many years, a considerable amount of effort has been directed to the development of processes for converting coal and other abundantly occurring carbonaceous fuels into chemicals or synthetic natural fuels. In such processes, a final step is the conversion of a synthesis gas mixture comprising carbon monoxide and hydrogen into methane, methanol, light alkanes or the like. Many such processes are known to the art and most involve the use of catalytic vessels for the final step. Further, continuing efforts have been directed to the development of methods whereby heat may be transferred from a central heat source to a remote location such as a home, office buildings or the like economically and efficiently.

In the reaction of carbon oxides and hydrogen to produce methane for instance, a continuing problem is sulfur poisoning of the catalyst bed and the pressure drop across the catalyst bed. Further, the amount of material which may be reacted in the bed is limited, at least to some extent, by the temperature increase across the catalyst bed. It has now been found that monolithic substrates containing channels having catalytic inner surfaces as a result of coating the inner surfaces or imbedding catalyst in the material from which the monolithic substrates are formed, are useful in such reactions. An article describing the use of such monolithic substrates in such reactions is "Monolithic Catalyst Favored for Methanation", Tucci and Thompson, Hydrocarbon Processing, February 1979, pp. 123–126. In this article, which is hereby incorporated by reference, the use of catalyzed metal and ceramic monoliths for the reaction of carbon monoxide and hydrogen to produce methane is discussed.

In a prior art search conducted on the concept of the present invention, the following references were discovered:

| U.S. Pat. No. | Issue Date | Inventor |
| --- | --- | --- |
| 2,013,707 | 9/10/35 | Williams |
| 2,209,040 | 7/23/40 | Simpson et al. |
| 2,518,270 | 8/8/50 | Ban |
| 2,594,329 | 4/29/52 | Mayhew |
| 2,655,437 | 10/13/53 | Garlo |
| 2,662,911 | 12/15/53 | Dorschner et al. |
| 2,778,610 | 1/22/57 | Bruegger |
| 2,852,350 | 9/16/58 | Kolbel et al. |
| 2,868,627 | 1/13/59 | Kolbel et al. |

It has now been found that an improvement in such reactors is accomplished by an improvement comprising positioning a plurality of passageways through the monolithic substrate generally parallel to the channels positioned through the monolithic substrate with the passageways being adapted to pass a heat exchange fluid through the monolithic substrate.

FIG. 1 shows an embodiment of the present invention;

FIG. 2 is a cross-sectional view of the embodiment of the apparatus of the present invention shown in FIG. 1 taken along line 2—2;

FIG. 3 is a schematic diagram of a process wherein the improved reactor of the present invention is useful; and FIG. 4 is a schematic diagram of another process wherein the improved reactor of the present invention is useful.

In the description of the Figures the same numbers will be used to refer to the same or similar components throughout.

FIG. 1, the improved reactor 10 of the present invention is shown. Reactor 10 comprises a casing 14 containing a monolithic substrate 12 which contains a plurality of small channels 18 as commonly used in such monolithic substrates. Channels 18 are desirably coated with catalyst on their inner surfaces or formed from a monolithic substrate material which includes the desired catalyst. Channels 18 are positioned generally parallel through substrate 12 with openings at each end of substrate 12. By the improvement of the present invention a plurality of conduits 20 are positioned through substrate 12 for the passage of a heat exchange fluid therethrough. As shown in FIG. 1, the heat exchange fluids flows through conduits or passageways 20 and is recovered in a header 22 and passed to an outlet 24. The heat exchange fluid is introduced through a similar arrangement via a heat exchange fluid inlet 34. The reaction products are recovered via a product outlet 30 which is positioned on one end of casing 14 to receive the gaseous products flowing from channels 18 into casing 14. Similarly, the reactants are passed into substrate 12 via a reactant inlet 32. Clearly, a variety of means for charging the reactants to substrate 12 are known to the art and such means are suitable so long as substantially even flow is accomplished across the cross-sectional area of substrate 12. Similarly, a variety of header means 22 can be used to recover the flow through passageways 20 for discharge through outlet 24. In the use of the improved reactor of the present invention, a reactant stream is charged to one end of substrate 12 via inlet 32 and passed therethrough under suitable reaction conditions to produce a product stream which is recovered from the other end of substrate 12 via outlet 30. A heat exchange fluid is injected via heat exchange fluid inlet 34, passed through substrate 12 and recovered via outlet 24 to accomplish heat transfer in substrate 12. As shown in FIG. 1, the heat exchange fluid flows co-currently with the reactants. In most instances, it is anticipated that counter-current flow will be used although either type of flow is within the scope of the present invention.

FIG. 2 is a cross-sectional view of the improved reactor of the present invention as shown in FIG. 1. FIG. 2 shows the small channels 18 positioned through substrate 12 and the passageways 20, positioned through substrate 12. As will be apparent, many more channels are present in substrate 12 than the number of passageways 20. Further, passageways 20 are considerably larger than channels 18. Channels 18 can be of any suitable configuration such as square, rectangular, round, triangular, etc. The configuration is normally chosen for convenience in fabrication or the like. The configuration of channels 18 is considered to be variable by those skilled in the art and no novelty is considered to reside in the specific configuration used since all such configurations are considered suitable in the practice of applicant's improvement.

In the fabrication of the improved reactor of the present invention, passageways 20 may be positioned through substrate 12 by drilling, by forming during the monolith substrate production process or the like. Further, conduits 20 may be formed with an extension from the ends of substrate 12 to permit the recovery of flow from passageways 20 or sleeves or the like may be sealingly positioned in the inlets and outlets of passageways 20. Further, tubular materials such as copper or the like could be used to extend through the entire length of substrate 12 to form passageways 20. The particular method of fabrication is not considered to comprise the essence of the present invention since any method of fabrication which results in the positioning of passageways 20 through substrate 12 for the flow of heat exchange fluids is considered suitable.

FIG. 3 is a schematic diagram of a process wherein the improved reactor of the present invention is considered useful. A methanol storage 40 is shown with a line 42 being positioned for the withdrawal of methanol therefrom. The methanol is typically liquid and is passed to a heat exchanger 44 where the methanol is vaporized and discharged as a vapor through a line 46 to a reactor 48, such as the improved reactor of the present invention, where the methanol is dissociated over a suitable reforming catalyst such as a copper-zinc base catalyst to produce hydrogen and carbon monoxide which are recovered through a line 50 and passed to a suitable combustion engine 52 where the carbon monoxide and hydrogen are combusted. A free-oxygen containing stream is injected into engine 52 via a line 54 with the exhaust stream from engine 52 being recovered via a line 56 and passed back through reactor 48 as a heat exchange fluid where it provides the heat required by the endothermic dissociation reaction of methanol into carbon monoxide and hydrogen. The exhaust stream is then recovered via a line 58 and passed to further heat exchange with the liquid methanol in heat exchanger 44 after which it is discharged via a line 60. The reactor of the present invention is considered to be particularly suitable for such applications since it results in a relatively low pressure drop and since it is readily adapted to the use of heat exchange fluids.

FIG. 4 is a schematic diagram of a further process in which the improved reactor of the present invention is useful. A heat source 70, which may be a carbonaceous fuel-fired plant, a nuclear reactor facility or the like, produces a heated stream which is discharged through a line 72 and passed to heat exchange with a reactant stream in a reactor 74 which is optionally of the type discussed above. The heat exchange fluid is recovered through a line 76 and passed back to plant 70 for reheating and the like. A suitable reactant stream charged to reactor 74 comprises methane and water. At least a portion of the water is added through a line 104. In reactor 74, the methane is at least partially reformed into carbon monoxide and hydrogen over a suitable reforming catalyst such as those disclosed in U.S. Pat. No. 4,017,274. The resulting stream, comprising carbon monoxide, hydrogen and optionally some methane, is passed via a line 80 through a heat exchanger 82 and to a remote location where it is reacted in a second reactor 86, which is optionally of the type discussed, to produce methane. The reaction conditions in reactor 86 are those known to the art for the production of methane and the catalyst used is a methanation catalyst. Such catalysts are considered to be well known to those skilled in the art as shown for instance in U.S. Pat. No. 3,890,113. The resulting product stream comprising methane is passed via a line 106 through a heat exchanger 88 and back to reactor 74. In most instances it will be desirable to remove quantities of condensed water from line 106 downstream of heat exchanger 88 via a line 102. The water removed via line 102 will be substantially equivalent to that added via line 104 but since transportation over long distances is contemplated, it is undesirable that the water remain in the pipeline system. In the practice of the embodiment shown, heat from power plant 70 is transferable over long distances via the closed system including reactors 74 and 86 which absorb heat via the chemical reactions occurring in reactor 74 with the heat being released in reactor 86 via the reactions occurring therein. Desirably, a heat exchanger fluid is used to remove heat from reactor 86 with the heat exchange fluid being injected via a line 98 and recovered via a line 96 with heat being removed from the circulating heat exchange fluid via a heat exchanger 100. As will be noted in the embodiment shown in FIG. 4 the heat exchange fluid flows countercurrently to the reactant stream. In the event that sufficient quantities of heat are not removed from the reaction zone in reactor 86, heat exchanger 88 is positioned to remove additional heat from the product gaseous stream with the heat being recovered by a heat exchange fluid injected via a line 90 and recovered via a line 92 with the heat being recovered from the circulating heat exchange fluid via a heat exchanger 94. By the use of the apparatus shown, heat is readily transferred from heat source 70 to a remote location where the heat is released at a desired location which may be an office building, a home or the like, wherein reactor 86 is positioned. It may not be necessary to include a heat exchanger such as heat exchanger 88 in the event that heat is effectively removed to the desired levels from reactor 86. Desirably flow to reactor 86 is controlled by a valve 84 to provide heat as required. Further, it is necessary that the flow rate to reactor 86 be controlled within reasonable limits to avoid damaging the catalyst etc. It will be noted that the process disclosed does not utilize streams in the catalytic reaction systems which contain contaminants. In other words, the system operates as a closed loop with the reactants being reacted repeatedly so that the addition of materials which would poison, contaminate or otherwise inactivate the catalyst surfaces is eliminated. By such a process heat is readily transferred from a central power source to a remote location.

The use of monolithic substrates as discussed herein is considered to be known to those skilled in the art as discussed, for instance, in the reference cited previously. The use of heat exchange means positioned in the monolithic substrate has not been known to the art heretofore to applicant's knowledge. By the use of such heat exchange means, the efficiency of the catalyzed metal or ceramic monolith is greatly improved since the heat is removed from the substrate itself rather than through the casing or the like. The use of such monolithic substrates results in the ability to use high flow rates through the catalyst with relatively low pressure drops. Pressure drops much lower than those typically encountered with the use of fixed beds or fluidized beds are achieved. The fabrication of such monolithic substrates is well known to those in the art. As discussed in the article, monoliths having 400 to 600 cells per square inch are well known, although, as indicated previously, the particular monolith used is not considered to constitute a part of the present invention.

Having thus described the present invention by reference to certain of its preferred embodiments, it is pointed out that the embodiments discussed are illustrative rather than limiting in nature, and that many variations and modifications are possible within the scope of the present invention. Many such variations and modifications may be considered obvious and desirable by those skilled in the art based upon a review of the foregoing description of preferred embodiments.

Having thus described the invention, I claim:

1. A reactor comprising:

a monolithic substrate and fluid distribution means, said monolithic substrate containing a plurality of substantially parallel channels completely through said monolithic substrate, said channels having catalytic surfaces, and a plurality of passageways completely through said monolithic substrate generally parallel to said channels, said passageways being adapted to pass a heat exchange fluid through said monolithic substrate, said passageways being larger in cross-section and fewer in number than said channels, said distribution means comprising a plurality of passageway extensions parallel to said passageways and each said extension extending coaxially from a passageway and opening into a header chamber having a header chamber outlet, said header chamber outlet being in fluid flow communication with each of said passageways, said channels opening into a product chamber, said product chamber having a product outlet in fluid flow communication with each said channel, said channels having channel walls and said passageways having passageway walls, said channel walls being integral with said passageway walls, each said passageway extension being connected to one of said passageways, each said passageway wall being mutually supporting with at least one said channel wall, and each said channel wall being mutually supporting with at least one other channel wall.

2. The reactor of claim 1 wherein said passageways further comprise tube means positioned through said substrate.

* * * * *